United States Patent [19]
Chadwick

[11] 3,907,080
[45] Sept. 23, 1975

[54] TELESCOPIC SHOCK ABSORBER AND DUST SHIELD

[75] Inventor: Stanley Vincent Chadwick, Wigan, England

[73] Assignee: General Motors Corporation, Detroit, Mich.

[22] Filed: Apr. 4, 1974

[21] Appl. No.: 458,006

Related U.S. Application Data

[62] Division of Ser. No. 224,049, Feb. 7, 1972, Pat. No. 3,844,314.

[30] Foreign Application Priority Data

Feb. 25, 1971   United Kingdom................. 5454/71

[52] U.S. Cl. .................... 188/322; 29/453; 138/109
[51] Int. Cl.²............................................ F16F 9/38
[58] Field of Search ............ 188/322; 403/247, 264; 29/453; 138/109

[56] References Cited
UNITED STATES PATENTS

| | | | |
|---|---|---|---|
| 2,788,092 | 4/1957 | Whisler, Jr. | 188/322 |
| 2,884,283 | 4/1959 | Korol et al. | 29/453 |

FOREIGN PATENTS OR APPLICATIONS

| | | | |
|---|---|---|---|
| 1,902,019 | 8/1970 | Germany | 188/322 |
| 1,336,185 | 7/1963 | France | 188/322 |

*Primary Examiner*—George E. A. Halvosa
*Attorney, Agent, or Firm*—J. C. Evans

[57] ABSTRACT

An injection-moulded polypropylene dust shield tube (stone guard) which can be mounted with a snap-on fit on a flange member carried by a piston rod of a telescopic shock absorber, primarily for use in a motor vehicle, comprises a hollow cylindrical body portion formed adjacent one end with two axially spaced rings of circumferentially equi-spaced internal projections forming internal castellations, arranged with the castellations of the two rings in alternating sequence, and with circumferential clearance between the alternate castellations of the two rings as seen in end elevation.

With this construction, the injection moulding may be carried out using a two-part mould core the two parts of which, after moulding, are withdrawn in opposite axial directions without riding over, and thereby possibly damaging, the newly formed internal castellations.

1 Claim, 5 Drawing Figures

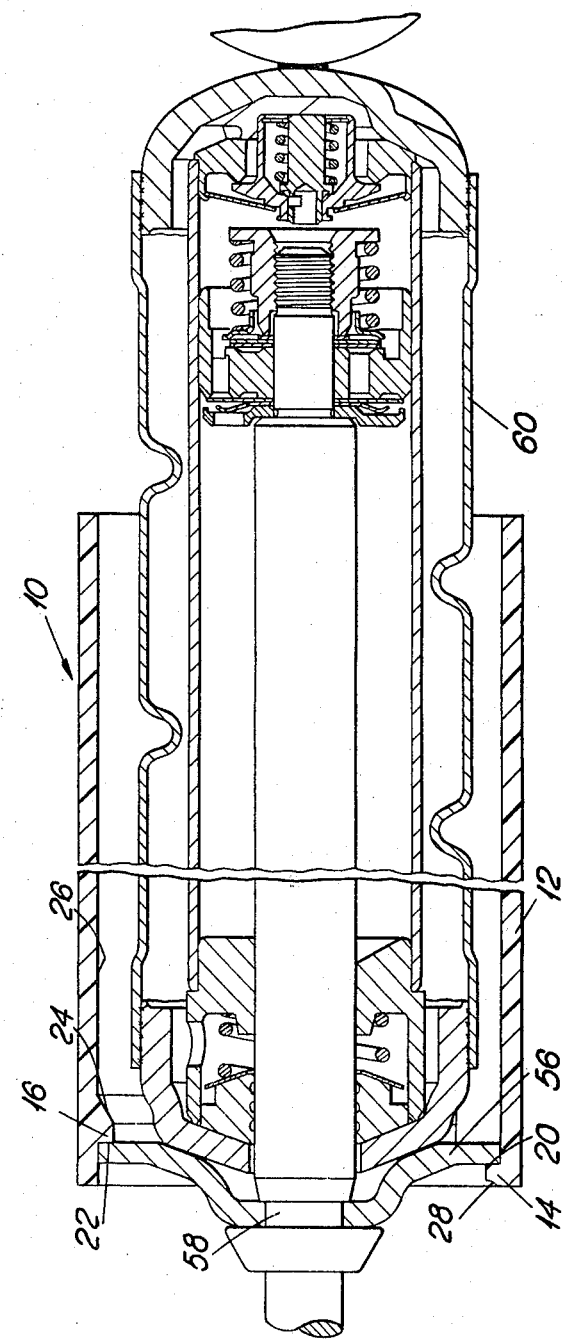

3,907,080

TELESCOPIC SHOCK ABSORBER AND DUST SHIELD

This application is a division of application Ser. No. 224,049, filed Feb. 7, 1972, now U.S. Pat. No. 3,844,314.

This invention relates to telescopic shock absorbers, for use in motor vehicles.

The invention is more particularly concerned with an injection-moulded polypropylene dust shield tube which can be mounted with a snap-on fit on a flange member carried by a piston rod of the shock absorber, such that the tube is effective to protect the working parts of the shock absorber from the entry of dirt and other foreign materials.

According to the invention, a dust shield tube for a telescopic shock absorber is injection-moulded from polypropylene plastics material and comprises a hollow cylindrical body portion formed adjacent one end with two axially spaced rings of circumferentially equi-spaced internal projections forming internal castellations, arranged with the castellations of one of the rings alternating with the castellations of the other ring, with circumferential clearance between the alternate castellations as seen in end elevation. This construction inter alia facilitates the injection moulding of the dust shield tube, and allows the use of a two-part mould core the two parts of which may be withdrawn in opposite axial directions without danger of damage to the castellations.

Conveniently, as seen in side elevation, the facing end surfaces of the castellations of the two rings extend radially of the longitudinal axis of the cylindrical body portion, and the axially opposite end surface of each castellation of the axially inner ring extends obliquely such that these opposite end surfaces form segments of an annular ramp from the internal surface of the body portion to the radially innermost portions of the castellations of the inner ring. A possible ramp angle is 180° − 30° = 150°. This construction facilitates assembly of the dust shield tube on to a flange member carried by a piston rod of a telescopic shock absorber, and permits effective retention of the dust shield tube on the flange member.

There may be four castellations in each ring, with their centres displaced 45° circumferentially relative to the centres of the alternate castellations of the other ring. This number of castellations permits efficient retention of the dust shield tube on the flange member, and can be injection-moulded without difficulty.

The injection-moulding of the dust shield tube may be effected by injecting molten polypropylene plastics material by way of a two-part mould core into an annular space between the mould core and a cylindrical internal surface of an outer mould portion, the end faces of the two parts of the mould core being provided with symmetrically arranged recesses which interfit when the mould parts are brought together, and the radially outer end of each recess opening into a cavity in the respective part of the mould core in an arrangement such that each of the two rings of castellations is formed by means of the cavities of a respective one of the two parts of the mould core, whereby after cooling of the injected polypropylene plastics material the two parts of the mould core can be withdrawn in opposite axial directions without interference with the castellations, whereupon the injection-moulded dust shield tube can be ejected from the outer mould portion.

The invention also comprehends a telescopic shock absorber assembly in which an injection-moulded polypropylene dust shield tube as aforesaid is retained with a snap-in fit by means of its two rings of castellations on a flange member carried by a piston rod for the piston of a piston-and-cylinder telescopic shock absorber.

In the drawings:

FIG. 5 is an enlarged fragmentary longitudinal section illustrating how the dust shield tube fits on to a flange member carried by the piston rod of a telescopic shock absorber.

Figure 1:
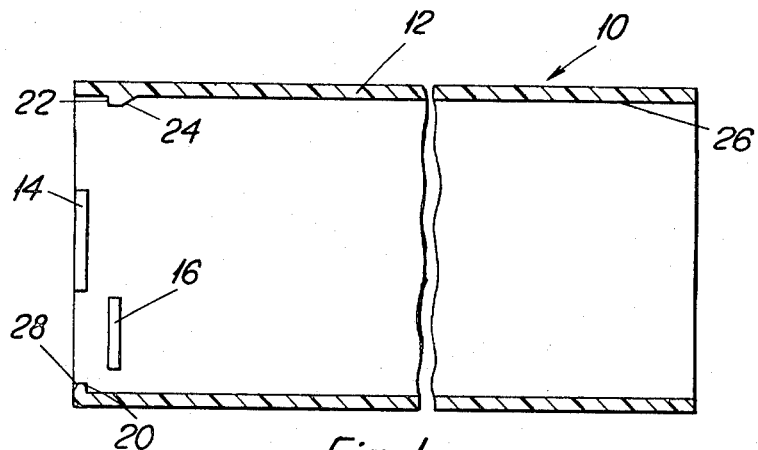
FIG. 1 is a fragmentary longitudinal section of one embodiment of a dust shield tube in accordance with the present invention.
Figure 2:
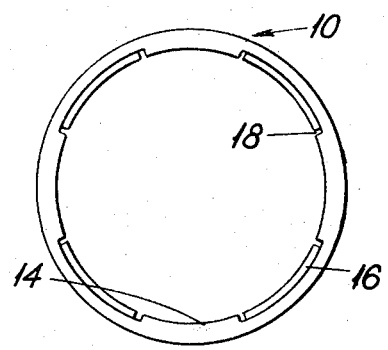
FIG. 2 is an end view of the dust shield tube shown in FIG. 1, showing two axially spaced rings of internal castellations.

As is seen for example in FIGS. 1 and 2 of the drawings, a dust shield tube, referred to generally as 10, for a telescopic shock absorber comprises a hollow cylindrical body portion 12 having at one end first and second rings of internal castellations 14 and 16 respectively, the first ring of castellations being an axially outer ring arranged at the end of the cylindrical body portion. Each of the rings of internal castellations 14 and 16 comprises four circumferentially equispaced internal projections, and the castellations of each ring are arranged alternately with the castellations of the other ring, whereby the centres of the castellations of each ring are displaced 45° circumferentially from the centres of the alternate castellations of the other ring. The circumferential lengths of the castellations are such that, as is shown in FIG. 2, there is a slight circumferential clearance 18 between the alternate castellations of the two rings as seen in end elevation of the dust shield tube.

Figure 4:
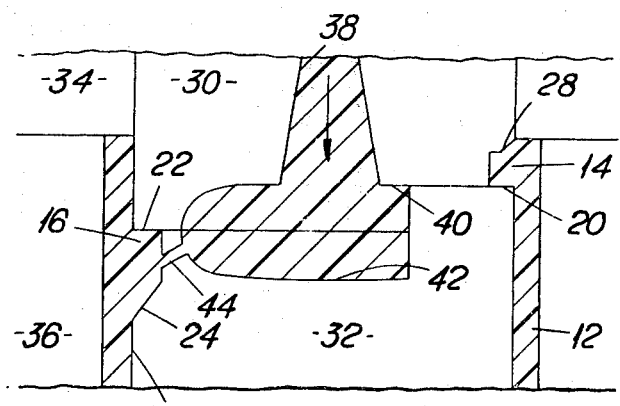
FIG. 4 is a fragmentary longitudinal section illustrating the relation of the mould parts during injection moulding.

As is also shown in FIG. 1, and rather more clearly in FIGS. 4 and 5, as seen in side elevation the facing axial end surfaces 20 and 22 of the castellations of the first and second rings 14 and 16 respectively extend in a direction radially of the longitudinal centre axis of the cylindrical body portion 12. The opposite axial end surfaces 24 of the castellations of the second ring 16, namely the surfaces of the castellations of this axially inner ring which face into the hollow interior of the cylindrical body portion 12, extend obliquely such that these opposite axial end surfaces 24 form segments of a circumferentially discontinuous annuular ramp from the cylindrical internal surface 26 of the body portion 12 to the radially innermost portions of the castellations of the inner ring 16. The ramp angle is 180° − 30° = 150° with respect to the axial direction of the cylindrical internal surface 26.

The outwardly facing axial end surfaces 28 of the castellations of the first (outer) ring 14 comprise a radially inner radially extending portion and a radially outer obliquely extending portion.

Figure 3:
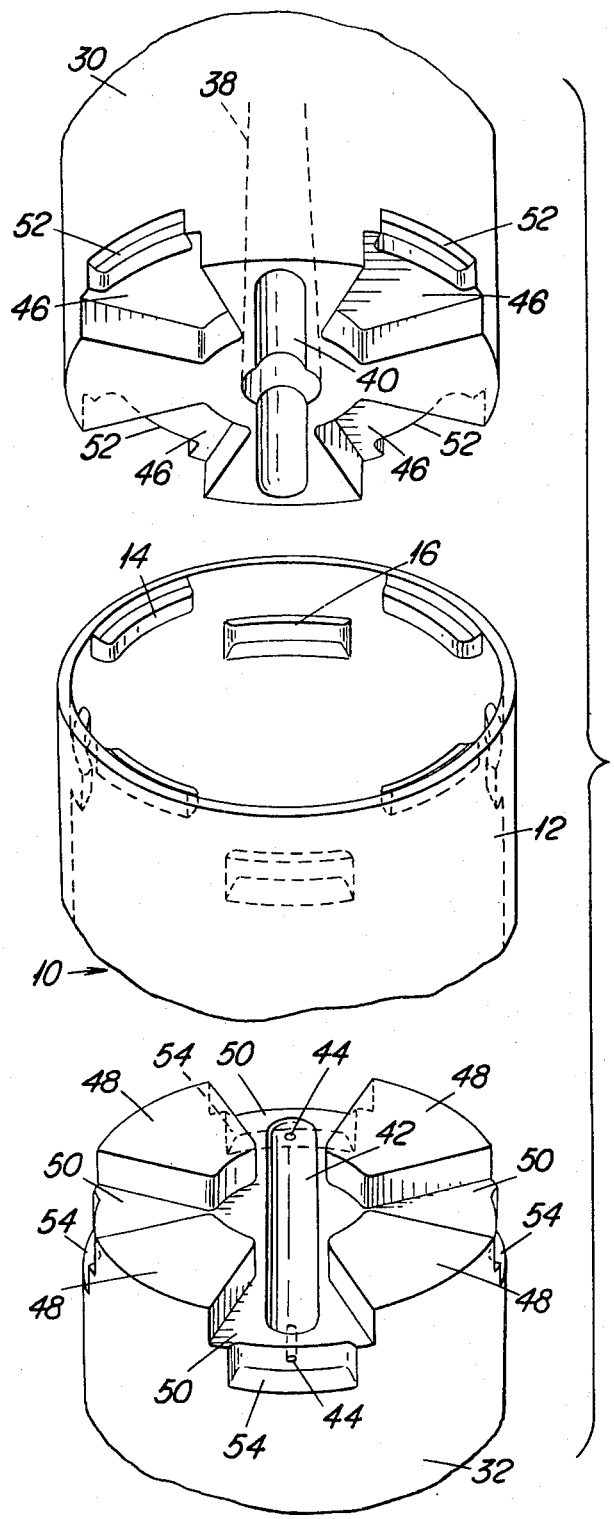
FIG. 3 is a fragmentary exploded view showing the castellations of the dust shield tube shown in FIGS. 1 and 2, and also showing the two parts of a two-part mould core which is used to form the castellations and, in conjunction with a stepped outer mould portion, a tubular body portion of the dust shield tube.

The dust shield tube 10 with its rings of internal castellations 14 and 16 in injection-moulded from polypropylene plastics material in a manner which is illustrated in FIGS. 3 and 4. As best seen in FIG. 4, first and second parts 30 and 32 of a two-part mould core are used to form the rings of castellations 14 and 16 and the internal cylindrical wall 26 of the hollow cylindrical body portion 12, and first and second parts 34 and 36 of a stepped outer mould portion are used to form the outer cylindrical wall of the body portion 12 and the axially end face of the body portion adjacent the first ring of internal castellations 14. For the injection moulding, with the various mould parts in the relative positions shown in FIG. 4, molten polypropylene plastics material which has been liquified by heating is injected through a slightly tapered feed passage 38 in the first part 30 of the mould core into a runner formed by mating depressions 40 and 42 in the two parts 30 and 32 of the mould core. At either end of the runner a gate 44 allows the molten material to run round the outside of the mould core and fill the space between the mould core and the outer mould portion, so forming the dust shield tube.

The method of forming the internal castellations is best illustrated in FIG. 3. The first part 30 of the mould core is formed with four symmetrically arranged sector-like recesses 46 which, when the mould parts 30 and 32 are brought together, interfit with correspondingly shaped projecting portions 48 of the mould part 32. Between the projecting portions 48, the mould part 32 has four sector-like recesses 50. The radially outer end of each recess 46 in the mould part 30 opens into a respective arcuate cavity 52 corresponding in shape to one of the internal castellations of the first ring 14, and correspondingly the radially outer end of each recess 50 in the mould part 32 opens into a respective arcuate cavity 54 corresponding in shape to one of the internal castellations of the second ring 16. The interfitting of the two parts 30 and 32 of the mould core is sufficiently close to prevent any moulded material from being present radially inwardly of the internal castellations, with the exception of sprue (from the feed passage, runner and gates) and possibly a little flash, which can readily be trimmed away.

The described method of forming the two rings 14 and 16 of internal castellations allows the two parts 30 and 32 of the mould core to be withdrawn, after the moulding operation, in opposite axial directions, without interference with the castellations, the arcuate cavities 52 and 54 used to form the castellations being open in the axial direction towards the end faces of the respective mould parts, so that there are no mould parts in a position likely to cause distortion of the newly formed castellations.

After withdrawal of the two parts of the mould core, the moulded dust shield tube is ejected from the outer mould portion in a conventional manner.

FIG. 5 illustrates how the dust shield tube 10 fits on to an annular external flange member 56 fixedly carried by a piston rod 58 of a telescopic piston-and-cylinder shock absorber (telescopic damper) referred to generally as 60. For assembly, the flange member 56 is passed through the length of the hollow interior of the cylindrical body portion 12 of the dust shield tube, until the annular ramp formed by the inclined surfaces 24 of the internal castellations of the second ring 16 causes distortion of the tube until the castellations of the second ring ride over the flange member, whereupon secure snap-in retention of the flange member is effected with a close fit between the radially extending facing surfaces 20 and 22 of the internal castellations of the first and second rings 14 and 16 respectively.

I claim:

1. A telescopic shock absorber comprising an inner cylindrical casing having a central longitudinally extending axis, an outer cylindrical casing concentric with and radially spaced from said inner casing, a piston mounted for reciprocating axial movement in said inner cylindrical casing, a reciprocally movable piston rod operatively connected to said piston and extending axially out of said cylindrical casings, a disk-like flange member rigidly secured to a portion of said piston rod extending outwardly of said cylindrical casings, said flange member having an outer peripheral edge portion of predetermined thickness, a dust shield for said shock absorber, said dust shield consisting of a hollow and continuous cylindrical body of flexible plastic material extending around a portion of said rod and a portion of said outer cylindrical casing, said dust shield having a first ring of separate arcuately spaced and inwardly projecting castellations integral with said cylindrical body adjacent to one end thereof, said dust shield further having a second ring of separate arcuately spaced and inwardly projecting castellations integral with said cylindrical body axially spaced a predetermined distance from the first ring of castellations, said first and second rings of castellations providing a seat therebetween to receive said annular peripheral edge portion of said flange member, said castellations of said first and second rings respectively having contact surfaces which face one another for respectively engaging and gripping the upper and lower sides of said peripheral edge portion of said flange member when said flange member is positioned in said seat, said castellations of said second ring being formed with a ramp so that said dust shield can be deflected by said flange member when said flange portion is axially inserted into said dust tube to permit said peripheral portion of said flange member to be subsequently trapped between said first and second rings of castellations.

* * * * *